US011433951B2

(12) United States Patent
Fischer et al.

(10) Patent No.: US 11,433,951 B2
(45) Date of Patent: Sep. 6, 2022

(54) FASTENING SYSTEM WITH A LOAD RAIL AND A LOAD SLIDE, IN PARTICULAR FOR A PICK-UP TRUCK

(71) Applicant: KIPP GmbH & Co KG, Sulz (DE)

(72) Inventors: Sascha Fischer, Empfingen (DE); Waldemar Ekkert, Freudenstadt (DE); Waldemar Kalatschew, Dornstetten (DE)

(73) Assignee: KIPP GmbH & Co KG, Sulz (DE)

( * ) Notice: Subject to any disclaimer, the term of this patent is extended or adjusted under 35 U.S.C. 154(b) by 306 days.

(21) Appl. No.: 16/830,777

(22) Filed: Mar. 26, 2020

(65) Prior Publication Data

US 2020/0307720 A1 Oct. 1, 2020

(30) Foreign Application Priority Data

Mar. 28, 2019 (DE) ...................... 10 2019 204 386.0

(51) Int. Cl.
  *B62D 33/02* (2006.01)
  *B62D 33/037* (2006.01)
  *B60R 9/06* (2006.01)
  *B60R 11/00* (2006.01)

(52) U.S. Cl.
  CPC ............ *B62D 33/0207* (2013.01); *B60R 9/06* (2013.01); *B62D 33/037* (2013.01); *B60R 2011/0047* (2013.01); *B60R 2011/0078* (2013.01)

(58) Field of Classification Search
  CPC .... B62D 33/0207; B62D 33/037; B60R 9/06; B60R 2011/0047; B60R 2011/0078
  See application file for complete search history.

(56) References Cited

U.S. PATENT DOCUMENTS

| 5,484,240 A | * | 1/1996 | Rosenberg | B62D 27/06 410/106 |
| 6,256,844 B1 | | 7/2001 | Wheatley | |
| 7,229,116 B1 | * | 6/2007 | Bruford | B60P 3/40 296/57.1 |
| 7,549,828 B2 | | 6/2009 | Smith | |

(Continued)

FOREIGN PATENT DOCUMENTS

| DE | 60 2004 004 731 T2 | 11/2007 |
| DE | 10 2008 021 806 A1 | 11/2009 |

(Continued)

*Primary Examiner* — Brian D Nash
(74) *Attorney, Agent, or Firm* — Hackler Daghighian Martino & Novak

(57) ABSTRACT

A fastening system for fastening loads on vehicles includes a load slide arranged on and movable on a load rail along an extension direction. The load slide includes a fastening device for fastening a securing element and is lockable at different travel positions on the load rail. On the outside of the load rail a plurality of locking recesses are formed along the extension direction. The load slide includes a rotatably mounted cam, which is rigidly connected to an actuating element and which can be rotated with the actuating element between a locked position and an unlocked position. In the locked position, the cam can engage with one of the locking recesses and thus lock the travel position of the load slide. In the unlocked position, the cam is disengaged with respect to the locking recesses and the load slide can thus be moved on the load rail.

23 Claims, 11 Drawing Sheets

(56) References Cited

U.S. PATENT DOCUMENTS

| | | |
|---|---|---|
| 7,578,645 B2 | 8/2009 | Terry et al. |
| 8,414,236 B2 | 4/2013 | Murphy |
| 8,550,757 B2 | 10/2013 | Anderson et al. |
| 9,914,386 B2 | 3/2018 | Livesay et al. |
| 10,399,421 B2* | 9/2019 | Smith .................... F16B 7/044 |
| 10,919,369 B2* | 2/2021 | Lewis ..................... B60J 7/141 |
| 2007/0224011 A1* | 9/2007 | Cunningham ............ B60P 7/15 410/152 |
| 2008/0101883 A1* | 5/2008 | Derecktor ............. B60P 7/0815 248/220.21 |
| 2010/0260541 A1* | 10/2010 | Daouk ............... B60N 2/01591 403/321 |
| 2011/0315731 A1* | 12/2011 | Takemura ............ B60P 7/0815 224/567 |
| 2012/0275877 A1* | 11/2012 | Moradians ........... B60P 7/0815 410/104 |
| 2014/0341634 A1* | 11/2014 | Chatwin ................ B60R 11/00 403/11 |
| 2015/0071727 A1 | 3/2015 | Hemphill et al. |
| 2016/0059906 A1* | 3/2016 | Leitner ................... B60R 9/058 296/3 |
| 2018/0141479 A1* | 5/2018 | Anderson ............... B60P 7/083 |
| 2019/0031078 A1 | 1/2019 | Livesay et al. |
| 2021/0039546 A1* | 2/2021 | Reardon ............... B60P 7/0838 |
| 2021/0129919 A1* | 5/2021 | Smith ................ B62D 33/0207 |
| 2022/0024390 A1* | 1/2022 | Johnstun ............. B60P 7/0807 |

FOREIGN PATENT DOCUMENTS

| | | | |
|---|---|---|---|
| DE | 10 2014 110 953 A1 | 2/2016 | |
| DE | 10 2017 117 758 A1 | 2/2019 | |
| DE | 20 2018 1 06 361 U1 | 2/2019 | |
| EP | 159394 A * | 10/1985 | ............ B60P 7/0815 |
| EP | 1 108 608 A1 | 6/2001 | |
| WO | 01/96144 A1 | 12/2001 | |
| WO | 2006/029053 A1 | 3/2006 | |
| WO | 2017/034532 A1 | 3/2017 | |

\* cited by examiner

FASTENING SYSTEM WITH A LOAD RAIL AND A LOAD SLIDE, IN PARTICULAR FOR A PICK-UP TRUCK

CROSS-REFERENCE TO RELATED APPLICATIONS

This application claims priority to German Patent Application No. 10 2019 204 386.0, filed Mar. 28, 2019, the entire contents of which are hereby incorporated in full by this reference.

FIELD OF THE INVENTION

The invention relates to a fastening system for fastening loads on vehicles, comprising a load rail and a load slide arranged on the load rail and movable on the load rail along an extension direction of the load rail, wherein the load slide comprises at least one fastening device for fastening a securing element, and wherein the load slide can be locked in place at different travel positions on the load rail.

BACKGROUND OF THE INVENTION

Such a fastening system is known, for example, from DE 60 2004 004 731 T2.

Fastening systems are required in many vehicles to secure loads in the vehicle, especially to prevent them from falling over or sliding. Simple fastening systems are based on fastening devices that are permanently installed in the vehicle such as eyes, in or at which securing elements such as ropes or straps can be tied down. The securing elements are used, for example, to stretch across the loads and to thereby hold them in place in the vehicle.

For greater flexibility, fastening devices can also be arranged on load slides. Load rails on which the load slides can be moved and locked at various points are installed in the vehicle. The travel position of the load slide on the load rail can be adapted to the load to be fastened (secured).

In the fastening system known from DE 60 2004 004 731 T2, a rail which is essentially C-shaped in the cross section and on which a connector assembly can be moved is provided. The connector assembly comprises a holder which engages under the rail with a crosspiece at one end and is equipped with a thread at the other end which is screwed into a rotary handle. A shaft of the holder extends through the slot of the rail and a pressure-exerting member of the connector assembly. By turning the handle, the crosspiece can be moved towards the handle, whereby the rail is clamped between the crosspiece and the pressure-exerting member to lock the connector assembly in place. The connector assembly comprises an eye and two hooks extending in the longitudinal direction with the eye being arranged above the rotary handle.

In order to lock the connector assembly in place with this fastening system, a handle located under the eye has to be rotated, which is relatively difficult to do by hand. The clamping force also depends on the strength of the user so that the fastening system can easily become loose when operated by weaker users such as the elderly. In addition, the crosspiece can easily jam when the connector assembly is moved, for example due to a tilted rail, or also when the rail is dirty.

Further fastening systems with load rails and load slides are known, for example, from WO 2006/029053 A1, U.S. Pat. No. 8,414,236 B2, U.S. Pat. No. 8,550,757 B2, U.S. Pat. No. 7,549,828 B2 or EP 1 108 608 B1.

Fastening systems are also known from WO 2017/034532 A1, WO 01/96144 A1, U.S. Pat. No. 9,914,386 B2, US 2015/0071727 A1, U.S. Pat. No. 7,578,645 B2, U.S. Pat. No. 6,256,844 B1, DE 20 2018 106 361 U1, US 2019/0031078 A1, DE 10 2017 117 758 A1 or DE 10 2008 021 806 B4.

SUMMARY OF THE INVENTION

Object of the Invention

The object of the invention is to provide a fastening system that is easier and more reliable to use.

DESCRIPTION OF THE INVENTION

According to the invention, this object is solved by a fastening system of the type referenced above, which is characterized in that the load slide encompasses the load rail from the outside, that on the outside of the load rail a plurality of locking recesses is formed with the locking recesses following each other along the extension direction of the load rail, and the load slide comprises a rotatably mounted cam, which is rigidly connected to an actuating element and which can be rotated with the actuating element between a locked position and an unlocked position, wherein, in the locked position, the cam can engage with one of the locking recesses and thus lock the travel position of the load slide, and, in the unlocked position, the cam is disengaged with respect to the locking recesses, and the load slide can thus be moved on the load rail. The retaining mechanism according to the invention is able to clamp the load slide on the load rail in an easy and reliable and especially in a robust manner as well.

According to the invention, the load slide encompasses the rail from the outside. Due to this encompassment, force can be introduced onto the load rail over a comparatively large area and over a comparatively large solid angle range as compared with a clamped crosspiece or groove piece that engages through a slot below a C-shaped load rail of the prior art. In particular, force can also be introduced directly onto the outside of the load rail. Because the load rail is encompassed from the outside, it does not have to be designed with an open interior that can easily become dirty (and thereby jam a load slide) and is difficult to clean. Dirt that settles on the load rail in the fastening system, according to the invention, can simply be pushed away or removed with the load slide and, for example, fall to the ground. Accordingly, there is hardly any risk that the load slide will jam or tilt on the load rail of the fastening system according to the invention.

The locking mechanism of the fastening system according to the invention is based on a cam which is able to engage in locking recesses formed on the outside of the load rail. Because the locking recesses are on the outside, they are easy to manufacture, for example by milling, and are also easy to clean if necessary. Depending on the rotational position, the cam can block the movement of the load slide on the load rail by a positive fit when the cam engages in a locking recess, or release the load slide when the cam does not engage. Only the rotational position of the cam or the position of the actuating element is relevant for the locking, not the force of the user (as long as he can correctly set the rotational position of the actuating element, which is generally easy to do).

Due to the invention, the load rail and the load slide can be configured in such a way that the cam or the actuating element can only be brought into the locked position if there is also a corresponding locking recess at the location of the cam and thus sufficient space for the cam in the respective rotary position. If the load slide is not at the location of a cam, the load rail (which does not have a recess at this location) blocks the rotation of the cam into the locked position, and the actuating element cannot be moved from the unlocked position to the locked position. This ensures that the load slide is always locked when the actuating element is in the locked position. The position of the actuating element (which corresponds to the rotational position of the cam rigidly connected to the actuating element) can generally be easily seen by the user, for example simply by looking at the position of an actuating element which is designed, for example, as a lever. If desired, an additional optical visualization of the position of the actuating element can be provided, for example by hiding or exposing notice areas of different colors in the different positions, for example with a green area visible in the locked position and a red area visible in the unlocked position.

Since the cam engages in locking recesses formed on the outside of the load rail, the actuating mechanism of the cam, in particular the actuating element, can be configured on the load slide in an easily accessible and easy-to-use manner. As a rule, it should be possible to operate the actuating element with one hand without any problems, and the load slide, including a movement on the load slide, can generally be operated with one hand as well.

The locking recesses are preferably designed as (cylindrical) round depressions; as a result, a certain self-centering of the load slide on the locking recess occurs during the locking process. The cam typically engages in the recesses with a round outer section.

Preferred embodiments of the fastening system according to the invention:

A preferred embodiment of the fastening system according to the invention provides that the load rail comprises: a base on which a contact surface is formed for bearing the load rail on the vehicle; and a header which laterally protrudes on two opposite sides with collar elements from the base; and that the load slide encompasses the header and thereby engages behind the collar elements of the header with clamping elements of the load slide. This structure is particularly robust and easy to install. The load slide is held undetachably and can easily absorb forces from a particularly large solid angle range. The load rail can, for example, be placed and fastened, for example with screws, to a side wall or a floor in a loading space. The cross-section of the load rail may preferably be mushroom shaped with the header being rounded toward the front (away from the contact surface) and preferably also rounded toward the sides; the latter easily prevents damage to the cargo.

In a further preferred development of this embodiment, the locking recesses are formed on one of the collar elements, in particular wherein the locking recesses are formed on the lateral outside of this collar element. This is easy to manufacture. In addition, this makes it possible that the locking mechanism can be arranged essentially to the side of the load rail (and in particular does not have to be arranged in front of/above the load rail); as a result the loading space can be used particularly efficiently.

In one advantageous embodiment, the actuating element is fastened to the load slide with a screw which is screwed into the load slide from a side of the load slide facing the contact surface. As a result, the screw usually faces a loading floor or a loading space wall when the fastening system is mounted and is therefore difficult or impossible to access by an unauthorized individual (a thief, for example).

A further development in which, in a cross section perpendicular to the extension direction of the load rail, a respective contact surface runs between the clamping elements and the collar elements at least in an engaging section at an angle $\alpha$ to the surface normal of the contact surface, with $\alpha>90°$ is advantageous as well. The rear engagement of the collar elements with the clamping elements is performed, so to speak, at an "extremely sharp" angle. As a result, it is practically impossible for the load slide to slip off the load rail, even under large, active forces (of the load). With this geometry, an elastic deformation due to the application of force cannot reduce the rear engagement of the load slide and load rail.

In a preferred embodiment, the load rail comprises an auxiliary locking device with a resilient element, that the load slide comprises a plurality of auxiliary locking recesses, that, when moving the load slide on the load rail, the resilient element can automatically snap into one of the auxiliary locking recesses at a plurality of travel positions, and that at the travel positions of the load slide snapped in place, the cam is arranged on one of the locking recesses so that the cam can engage in the locking recess when the locked position is set with the actuating element. With the resilient element, the load slide can be easily pre-positioned on the load rail at travel positions that are suitable for interlocking with the cam due to the distribution of the locking recesses. The locking of the fastening system is thereby facilitated, in particular if, due to a noticeable spacing of the locking recesses, locking is only possible at certain points or in certain areas of the load rail. The resilient element preferably snaps in place in a noticeable and/or audible manner when a suitable travel position of the load slide is reached. It should be noted that a rough pre-positioning is sufficient if, due to the shape of the locking recesses and/or the cam, a certain self-centering of the load slide on a locking recess occurs when locking. The snapped-in condition of the resilient element can be easily overcome by applying manual force, typically with one hand, and is generally not sufficient in itself to hold a load slide under load in place.

In an advantageous further development of this embodiment, the locking recesses for the cam are at the same time the auxiliary locking recesses for the resilient element. If the locking recesses for the cam are simultaneously used as the auxiliary locking recesses for the resilient element, this is particularly easy to manufacture and therefore cost-effective. It should be noted that the cam and the resilient element use different (for example adjacent) locking recesses at the same time. Alternatively, separate sets of locking recesses and auxiliary locking recesses can be provided on the load rail.

In a further preferred development, the resilient element is designed as a spring plunger. The pre-positioning can be achieved in a simple and robust manner by means of a spring plunger. The spring plunger engages in the auxiliary locking recesses with a ball and can be pressed against the force of a spring into a pressure piece sleeve in which the spring and on which the ball is mounted in order to move the load slide. If the locking recesses are also used as auxiliary locking recesses, the ball usually has a certain amount of play in one locking recess.

An embodiment is also advantageous if the locking recesses are arranged in direct succession in the extension direction of the load rail. As a result, the load slide can be positioned on the load rail in a very precise manner. On the other hand, an auxiliary locking device can often be dispensed with since the cam can practically always slide into a locking recess and since the load slide can center itself with respect to this locking recess. For this purpose, the locking recesses and/or the cam typically have a round or converging shape (at least in sections).

In an alternative, preferred embodiment, the locking recesses are arranged at a distance from one another in the extension direction of the load rail, in particular at a periodic distance from one another. In this case, fewer recesses need to be made, which lowers the manufacturing costs of the fastening system. In addition, the load rail maintains a more robust overall structure. With this type of construction, an auxiliary locking device is usually used to pre-position the load slide in a manner suitable for locking purposes. The locking recesses typically have a center distance which is at least twice as large, preferably at least three times as large as the width of the locking recesses in the extension direction.

Particularly preferred is an embodiment in which the actuating element is designed as a lever, in particular wherein, in the locked position, the lever is aligned parallel to the extension direction of the load rail and/or placed on the load slide, and, in the unlocked position, the lever is aligned transversely to the load rail and/or protrudes from the load slide. The lever is particularly easy to use and, thanks to its position, allows for a simple and intuitive visual detection of the locking position. Alternatively, the actuating element can also be designed, for example, as a rotary knob.

Also preferred is an embodiment in which there is a stop for the actuating element in the locked position, in particular wherein there is a further stop for the actuating element in the unlocked position. Stops avoid faulty operations of the actuating element, in particular resulting in an insufficient clamping force because the deflection of the actuating element is too small. The operator can simply turn the actuating element (each time) as far as it will go.

In a particularly advantageous embodiment, there is a retaining device with which the actuating element can be retained in the locked position, preferably with the retaining device also being able to retain the actuating element in the unlocked position. The retaining device prevents the actuating element from being unintentionally released from the locked position and thus the load slide from being able to move in an unintended manner. The retaining device preferably also prevents the actuating element from unintentionally disengaging from the unlocked position, in particular the actuating element (for example due to gravity) from moving a little in the "locked" direction; this prevents a misalignment of the cam or a tilting of the load slide on the load rail when moving. The retaining device can preferably be overcome by a use of manual force but not by the usual effects associated with driving the vehicle (such as shocks when driving through potholes or vibrations due to the running drive of the vehicle). The retaining device preferably snaps in a noticeable and/or audible manner when the locked position and possibly also the unlocked position are reached. A retaining device that can be used both in the locked position and in the unlocked position can be provided, for example, by a first antagonist of the retaining device (for example a spring plunger) on a part of the actuating element (for example a nose) that is arranged in front of the load slide both in the unlocked position and in the locked position, and opposite to this part (for example the nose) a separate second antagonist (for example a depression or recess into which the spring plunger engages) of the retaining device is provided for each of the two positions on the load slide, so a total of two second antagonists are formed on the load slide.

In a preferred development of this embodiment, the retaining device is designed as a resilient retaining device, in particular with a spring plunger. The design with a resilient retaining device is particularly simple. A spring plunger on the actuating element can, in particular, engage with its ball in an opposite recess (in the locked and possibly also in the unlocked position) on a base body of the load slide or vice versa. Alternatively, the retaining device can also be magnetic, for example.

Also preferred is an embodiment in which the cam has a round outer section with a variable radius so that, when the actuating element is rotated from the unlocked position into the locked position, the engagement of the cam in the locking recess becomes deeper, in particular with the round outer section being designed as an eccentric. In this embodiment, a clamping force between the load slide and the rail can be gradually increased by rotating the actuating element, which is simple to use and which can also facilitate the self-centering. Typically, the radius of the round outer section increases over its course in a strictly monotonous manner. The eccentric can preferably be formed by displacing a center of curvature radius for a part of the round outer section relative to a remaining part.

In addition, an embodiment is preferred in which the cam has a flattened outer section so that the flattened outer section is at least substantially parallel to the extension direction of the load rail in the unlocked position. This allows the cam for the unlocked position to be brought out of engagement with a locking recess in a confined space.

An embodiment is advantageous in which the cam is formed with a cam core made of metal and a cam sleeve made of plastic, which surrounds the cam core. The plastic cam sleeve (or cam bushing) makes it possible to reduce the friction between the cam and the load rail (which is usually made of metal, such as steel) when in engagement. Typically, the actuation of the locking mechanism generates less noise as well. Depending on the choice of material, corrosion on the cam and/or on the load rail can also be reduced. The cam core which is made of metal (such as steel) gives the cam good mechanical stability. The cam sleeve typically encloses the entire circumference of the cam core; it is not necessary, however, to enclose the front sides of the cam core (however, to be able to fasten the cam sleeve, a collar-like encompassment may be provided). The cam sleeve typically has a uniform thickness across its circumference and therefore traces the shape of the cam core. In order to prevent the cam sleeve from slipping on the cam core, it is preferred if the cam core does not have a rotationally symmetrical design but has, for example, a flattened (outer) section instead. A preferred material for the cam sleeve is polytetrafluoroethylene.

In a preferred embodiment, the at least one fastening device comprises a load-bearing eye and/or two opposing tie-down hooks. A securing element (such as a rope or strap) can be held in place or tensioned with the load-bearing eye or the tie-down hooks in a simple manner. A rope or strap can be passed through the eye or hooked into the eye. In particular, a rope can be wrapped around the tie-down hooks with a double-eight form.

Preferred is further an embodiment wherein the cam is rotatable about an axis of rotation, wherein the axis of rotation is perpendicular to the extension direction of the load rail. Typically, the axis of rotation is also perpendicular to a direction in which the collar elements laterally protrude with respect to a base of the load rail.

A vehicle, in particular a pick-up truck, with a fastening system according to the invention described above, with the load rail being attached to the vehicle with a load slide arranged thereon in the area of a loading space or a load floor also falls within the scope of the present invention. The fastening system, according to the invention, makes a simple and reliable fastening of loads (for example luggage in a car or containers/boxes/pallets in a truck) in the vehicle possible. The fastening of the load rail can in particular be carried out in a simple manner with screws which can be passed through a contact surface of a base of the load rail, for example. The vehicle may comprise a plurality of fastening systems according to the invention, and the fastening systems can also comprise a plurality of load slides for one load rail each.

A preferred embodiment of the vehicle, according to the invention, provides that the load rail has at each of its two ends an end stop for the load slide, which is either fixedly formed on the vehicle or which can only be released by opening a lockable tailgate or door. This makes stealing the load slide difficult in a simple but effective manner.

The use of a fastening system according to the invention as described above for fastening a load on a vehicle, wherein the load rail with a load slide arranged thereon in the region of a loading space or a load floor is fastened to the vehicle, wherein the load slide is moved on the load rail into a desired travel position and is locked in this position on the load rail, and wherein a securing element for the load, in particular a strap or a rope, is fastened, in particular tightened, to the at least one fastening device of the load slide falls within the scope of the present invention as well. The fastening system, according to the invention, is easy to install in or on the vehicle, can be easily adjusted to the load to be fastened by means of a suitable travel position on the load rail, and is also reliable and robust.

Further advantages of the invention will become apparent from the description and the drawings. Likewise, according to the invention, the above-mentioned features and those which are to be explained below can each be used individually for themselves or for a plurality of combinations of any kind. The embodiments shown and described are not to be understood as an exhaustive enumeration but rather have exemplary character for the description of the invention.

DETAILED DESCRIPTION OF THE PREFERRED EMBODIMENTS

Figure 1:
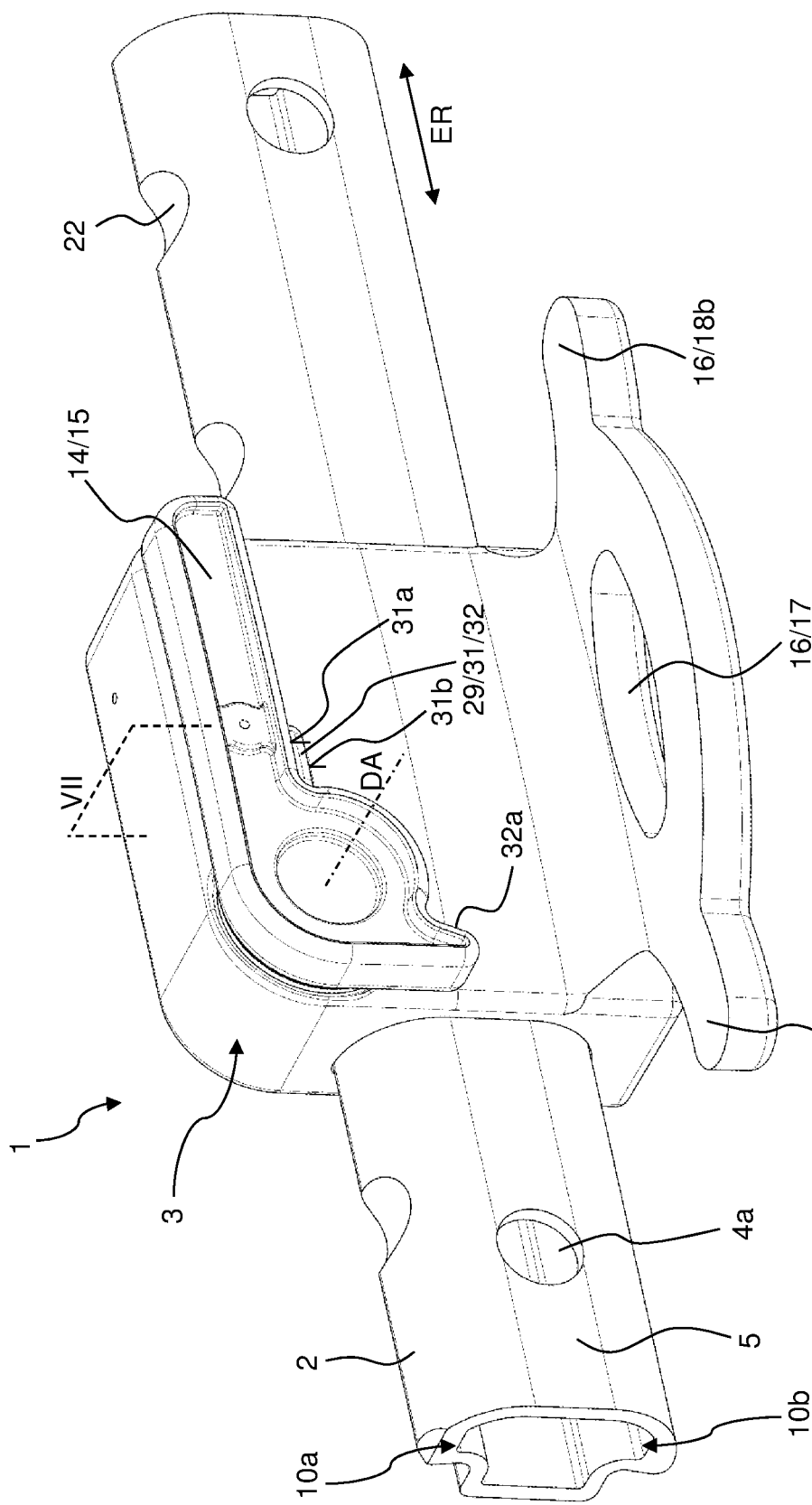
FIG. 1 shows a schematic view obliquely from the front of a first embodiment of a fastening system according to the invention.
Figure 2:
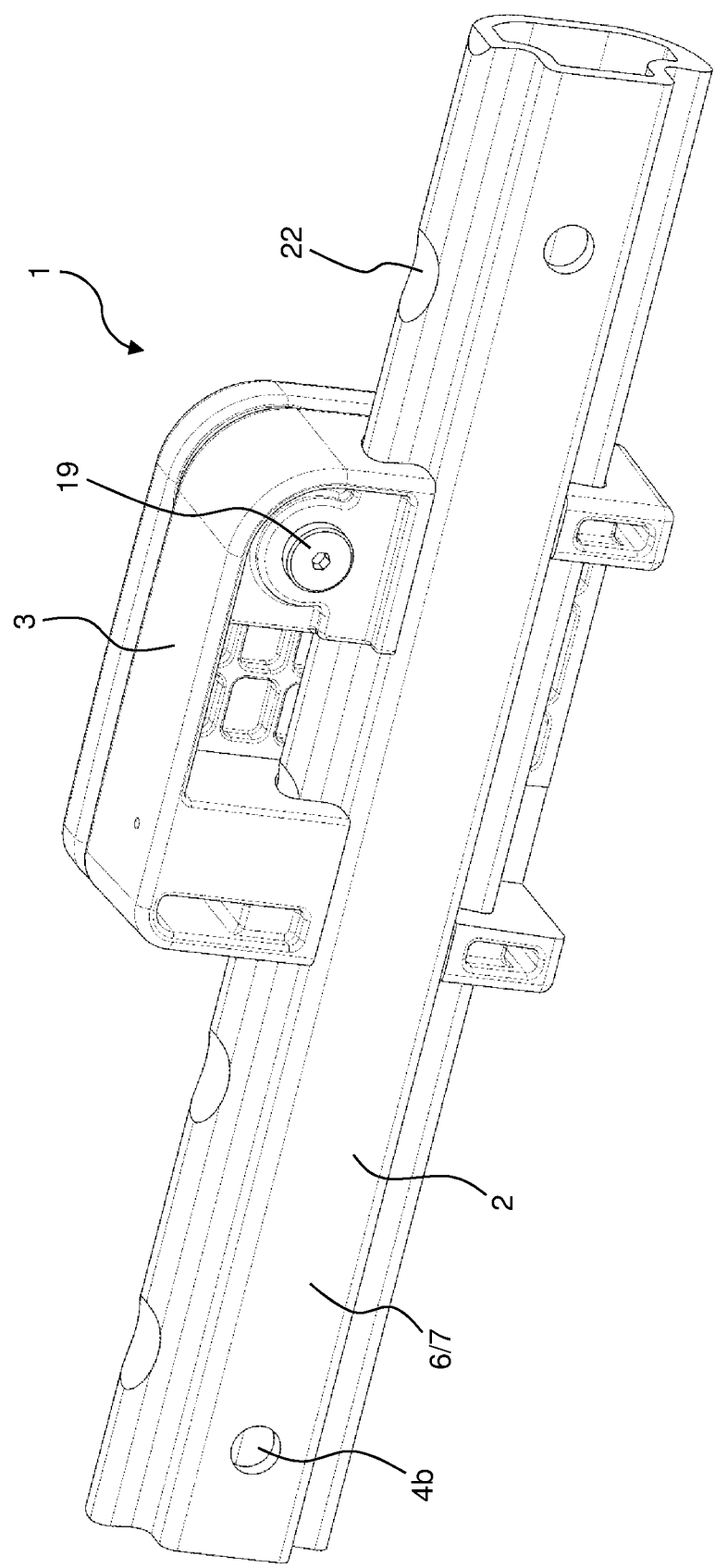
FIG. 2 shows a schematic view obliquely from behind of the fastening system of FIG. 1.
Figure 3:
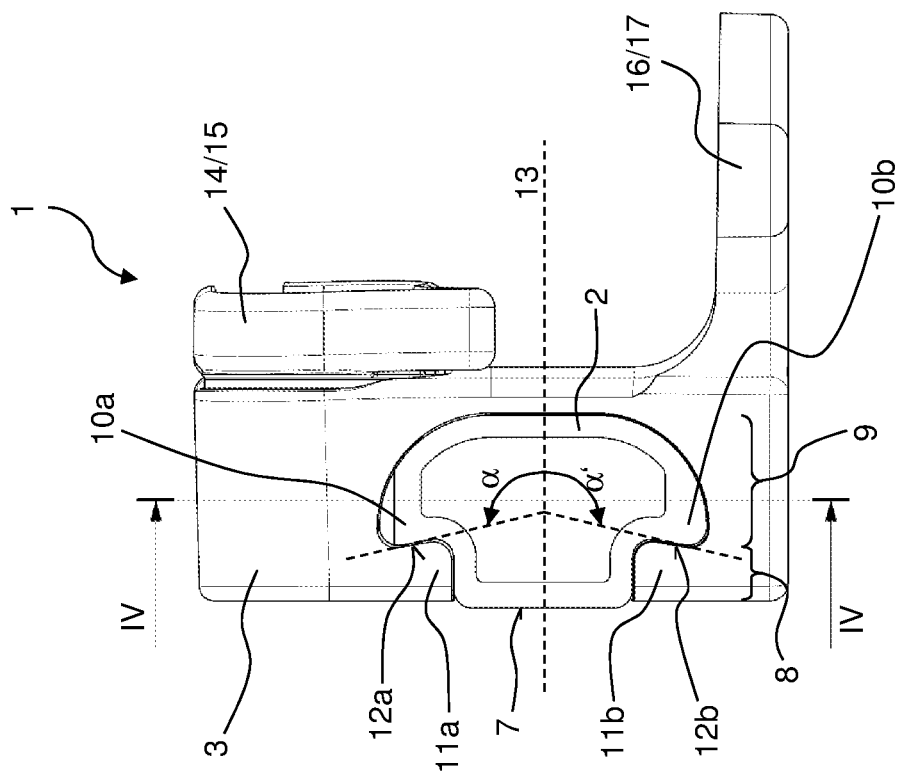
FIG. 3 shows a schematic front view of the fastening system of FIG. 1 with the actuating element in the locked position.

FIG. 1 in an oblique view from the front, FIG. 2 in an oblique view from the rear, and FIG. 3 in a frontal end view show a fastening system 1 according to the invention in a first embodiment.

The fastening system 1 comprises a load rail 2 to be fastened in or on a loading space or a load floor of a vehicle (see FIG. 9) and at least one load slide 3 which can be moved on the load rail 2 along an extension direction ER of the load rail 2.

The load rail 2 has holes 4a, 4b at a few points in order to screw the rail onto a load floor or a loading space wall. The holes 4a formed on the front side 5 of the load rail 2 are larger than the holes 4b formed on a rear side 6 so that fastening screws can be pushed through the holes 4a, and the screw heads of the fastening screws can engage behind the holes 4b. The load rail 2 is placed with a rear contact surface 7 on the load floor or on the loading space wall and fixed in place.

The load rail 2 comprises a base 8, on which the contact surface 7 is formed, and furthermore comprises a header 9. The header 9 laterally overlaps the base 8 with collar elements 10a, 10b (in FIG. 3 at the top and the bottom). The collar elements 10a, 10b are rounded towards the front side 5, which results in an overall mushroom-shaped cross section of the load rail 2.

Locking recesses 22, which are designed as cylindrical-round depressions, are provided on the lateral outside of the load rail 2, on the upper collar element 10a in this case. The locking recesses 22 are clearly spaced apart from one another in the extension direction ER (with a center distance which is approximately 3 times as large as the width of a locking recess 22 in the extension direction ER in this case); the locking recesses 22 are periodically arranged on the load rail 2.

The load slide 3 encompasses the load rail 2 at the header 9 in approximately a C shape, wherein the collar elements 10a, 10b of the header 9 of the load rail 2 are engaged behind by clamping elements 11a, 11b of the load slide 3. In a respective section 12a, 12b of an engaging contact surface between the collar elements 10a, 10b and the clamping elements 11a, 11b, an angle α, a' to the surface normal 13 of the contact surface 7 is approximately 105°, that is to say greater than 90°.

A locking mechanism is formed on the load slide 3, with which the load slide 3 can be locked on the load rail 2 at various travel positions along the extension direction ER. The locking mechanism is operated with an actuating element 15 embodied as a lever 14 in this case, the lever 14 being rotatable around an axis of rotation DA (refer below for more details). The lever 14 is fastened with a screw 19 (here a collar screw) to the rest of the load slide 3, which is screwed into the load slide 3 from the rear 6, i.e., from the side of the contact surface 7.

The fold down position of the lever 14 shown, which corresponds to a locked position, is defined by a stop 29, which is formed in this case by the upper side 31a of an extension 31 on the load slide 3, which the lever 14 touches in the locked position. The lever 14 extends essentially parallel to the extension direction ER of the load rail 2.

The load slide 3 has two fastening devices 16 in this case, namely a load-bearing eye 17 and a pair of opposing tie-down hooks 18a, 18b. A rope or a strap can be hooked in or passed through the load-bearing eye 17, for example. A rope or strap can be wrapped around the tie-down hooks 18a, 18b, for example in a double-eight form (not shown in more detail).

Figure 4:
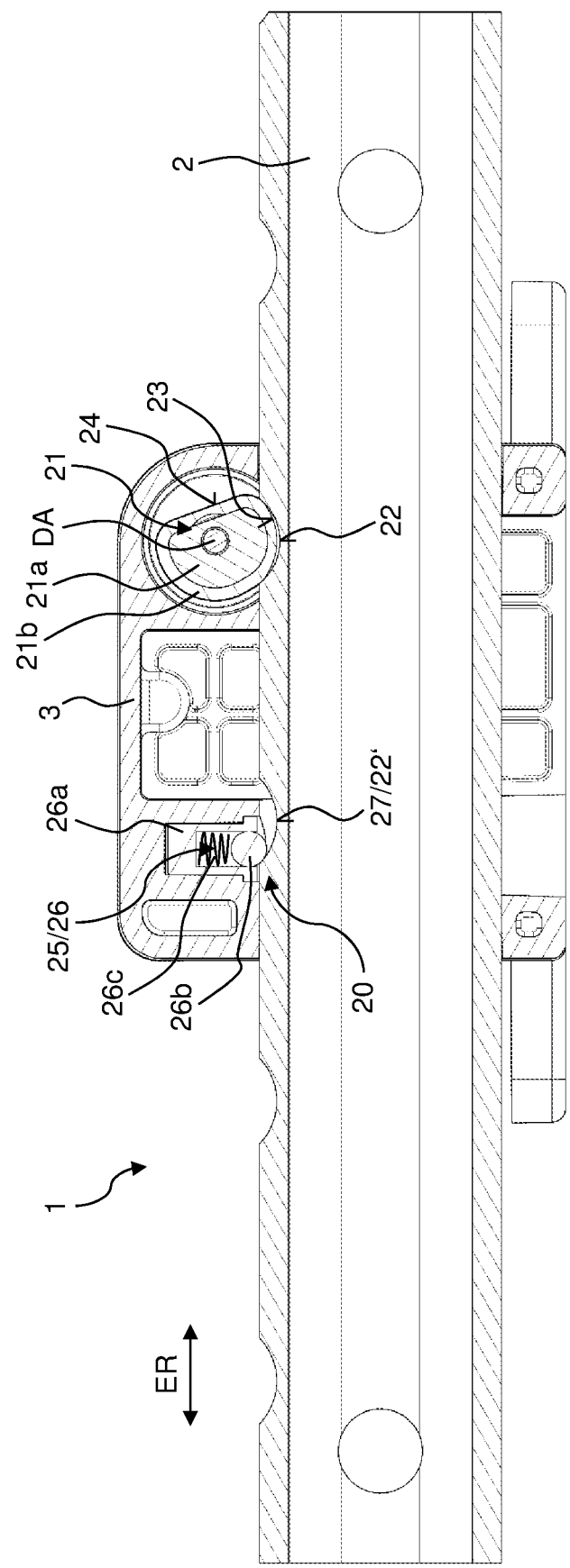
FIG. 4 shows a schematic longitudinal section through the fastening system of FIG. 3 through the plane IV.

FIG. 4 shows a longitudinal section through the fastening system 1 along the plane designated as IV in FIG. 3, in particular to illustrate the locking mechanism of the fastening system 1 and an additional auxiliary locking device 20.

A cam 21 is rigidly connected to the actuating element of the load slide 3 and can be rotated together with the actuating element around the axis of rotation DA. The axis of rotation DA extends perpendicular to the extension direction ER of the load rail 2, and in this case also perpendicular to the transverse direction of the load rail 2; in the transverse direction, the collar elements 10a, 10b protrude laterally with respect to the base 8 of the load rail 2 (compare FIG. 3, the transverse direction extends in FIG. 3 and FIG. 4 from top down, and accordingly the axis of rotation DA extends perpendicular to the contact surface 7). In the locked position of the actuating element shown in FIG. 4 (also refer to the previous FIGS. 1 to 3), the cam 21 engages in a locking recess 22 of the load rail 2. As a result, a movement of the load slide 3 on the load rail 2 is prevented by a positive locking; the load slide 3 is locked on the load rail 2 in the travel position shown in FIG. 4. The cam 21 engages with a round outer section 23 in the locking recess 22 with the round outer section 23 having a variable radius with respect to the axis of rotation DA. The cam 21 also has a flattened outer section 24 (more on this in FIG. 6).

In the embodiment shown, the cam 21 is formed with a cam core 21a, which is made of metal, and with a cam sleeve 21b, which is made of plastic. The cam sleeve 21b, the interior area (inner profile) of which is essentially the same as the exterior area (exterior profile) of the cam core 21a, serves as a type of socket into which the cam core 21a is inserted in order to prevent metallic friction between the load rail 2 and the cam 21 or the cam core 21a; the cam sleeve 21b is therefore also referred to as a cam bushing. This design avoids high wear as well as corrosion and oxidation. Unwanted noises are prevented as well. In the design shown, the cam sleeve 21b traces with its (radial) outer profile the (radial) outer profile of the cam core 21a (hidden in FIG. 4), and the cam sleeve 21b encloses the front sides of the cam core 21a in a collar-like manner with the majority of the front sides of the cam core 21a remaining uncovered.

The auxiliary locking device 20 is provided so that the travel position of the load slide 3 on the load rail 2 shown in FIG. 4 can easily be found (at least approximately) prior to locking. The auxiliary locking device 20 forms a resilient element 25 on the load slide 3, here a spring plunger 26. A pressure ball 26b is mounted in a pressure piece sleeve 26a, which is pushed outward (downward in FIG. 4) by a compression spring 26c and protrudes here into an auxiliary locking recess 27 of the load rail 2 in this case; the auxiliary locking recess 27 is one of the locking recesses 22', which could also be used by the cam 21. The force of the compression spring 26c can easily be overcome manually when the load slide 3 is moved on the load rail 2 (without the cam 21 engaging yet), and the snapping of the pressure ball 26b into an auxiliary locking recess 27 is easily felt and heard. When the load slide 3 is snapped by means of the auxiliary locking device 20, the cam 21 is at the same time placed sufficiently precise over a locking recess 22 in order to be able to engage. It should be noted that the round shape of the locking recesses 22 and the cam 21 (in the area of the round outer section 23) automatically centers the load slide 3 (or the cam 21) relative to the load rail 2 (or the locking recess 22) when the locking mechanism is being locked, i.e., the cam 21 slides centrally into the locking recess 22 and, if necessary, takes the load slide 3 with it.

Figure 5:
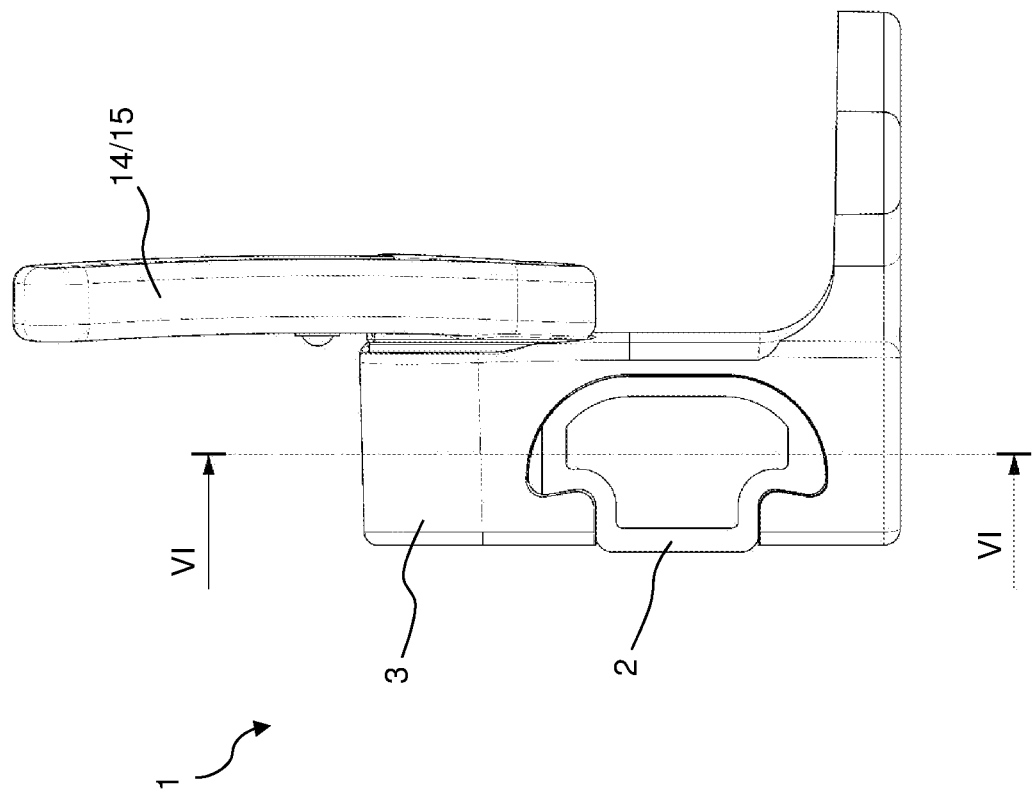
FIG. 5 shows a schematic frontal view of the fastening system of FIG. 1 with the actuating element in the unlocked position.

When the actuating element 15 or the lever 14 has been rotated into the unlocked position (here with the lever 14 projecting from the rest of the load slide 3), as shown in FIG. 5, the load slide 3 can be moved on the load rail 2. The unlocked end position of the lever 14 is defined here by a further stop 32 which is formed by an underside 31b of the extension 31 and a nose 32a on the actuating element 15 (refer to FIG. 1 in this regard). The unlocked position is shown in the longitudinal section of FIG. 6, which was carried out in the plane marked VI in FIG. 5 (the lever 14 being shown only partially for simplification purposes).

The cam 21 is now rotated around the axis of rotation DA in such a way that the flattened outer section 24 faces the load rail 2 and is (approximately) parallel to it. The cam 21, in particular the rounded outer section 23, is now disengaged with respect to the locking recesses 22 and therefore does not impair a movement of the load slide 3 along the load rail 2 in the extension direction ER.

Although the pressure ball 26b of the auxiliary locking device 20 still engages in the locking recess 22' in the illustrated travel position of the load slide 3, the pressure ball 26b can easily be pushed back into the pressure piece sleeve 26a by manual force if, when the load slide 3 is moved, the pressure ball 26b arrives at an intermediate section 28 between the locking recesses 22, 22'.

It should be noted that the rounded outer section 23 has a radius which is variable over its course with respect to the axis of rotation DA so that, when the cam 21 is screwed into the locking recess 22 (see arrow direction 30), the engaging radius gradually increases (refer to the gap between the cam bearing and cam 21, which gradually becomes smaller against the arrow direction 30). As a result, a gradually increasing clamping force can be achieved when rotating the lever 14 to the locked position.

Figure 6:
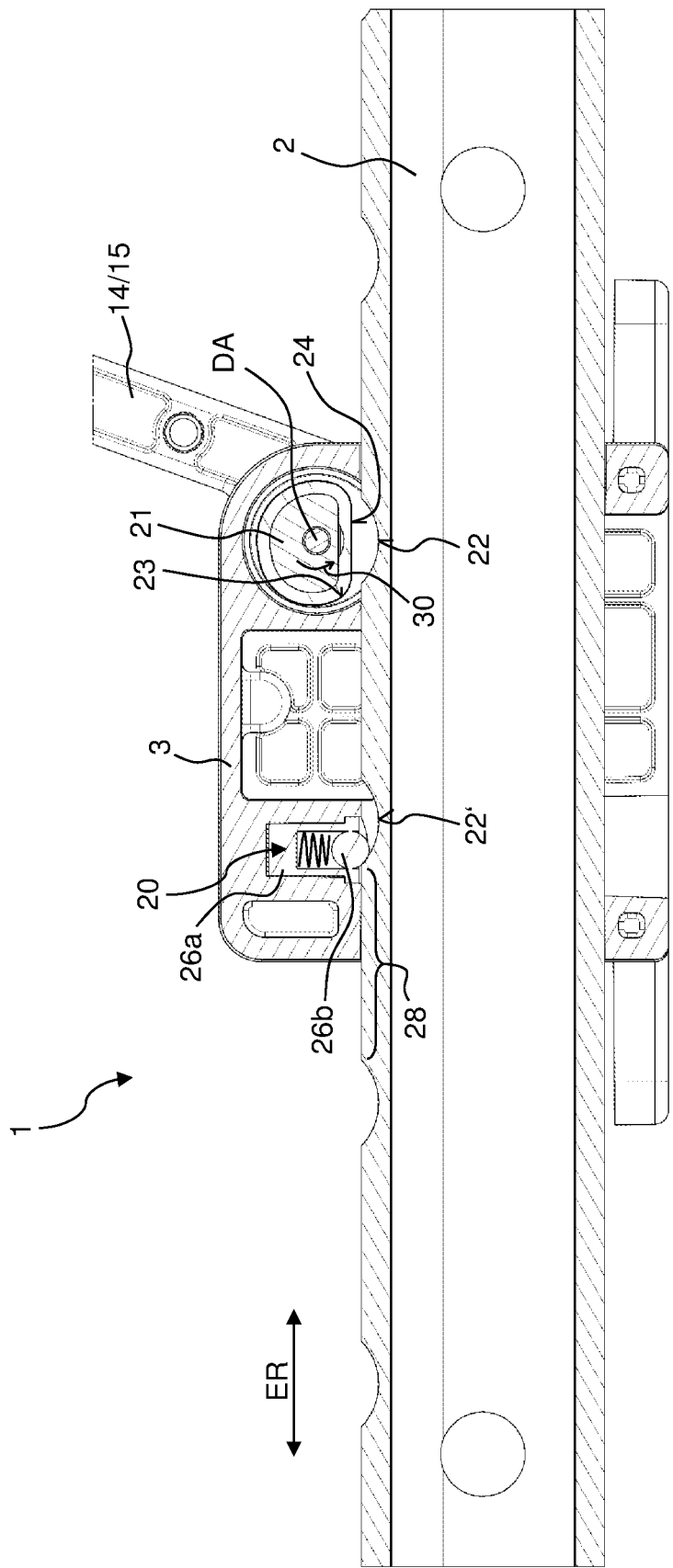
FIG. 6 shows a schematic longitudinal section through the fastening system of FIG. 5 through the plane VI.

It should be noted that a rotation of the lever 14 or of the actuating element 15 from the unlocked position, as shown in FIG. 6, into the locked position, as shown in FIG. 4, is only possible if the cam 21 is located at (here above) a locking recess 22; otherwise, the lever 14 would be blocked at an intermediate section 28 before the fold down end position of the lever 14 defined by the stop 29 (refer to FIG. 1 in this regard) is reached.

Figure 7:
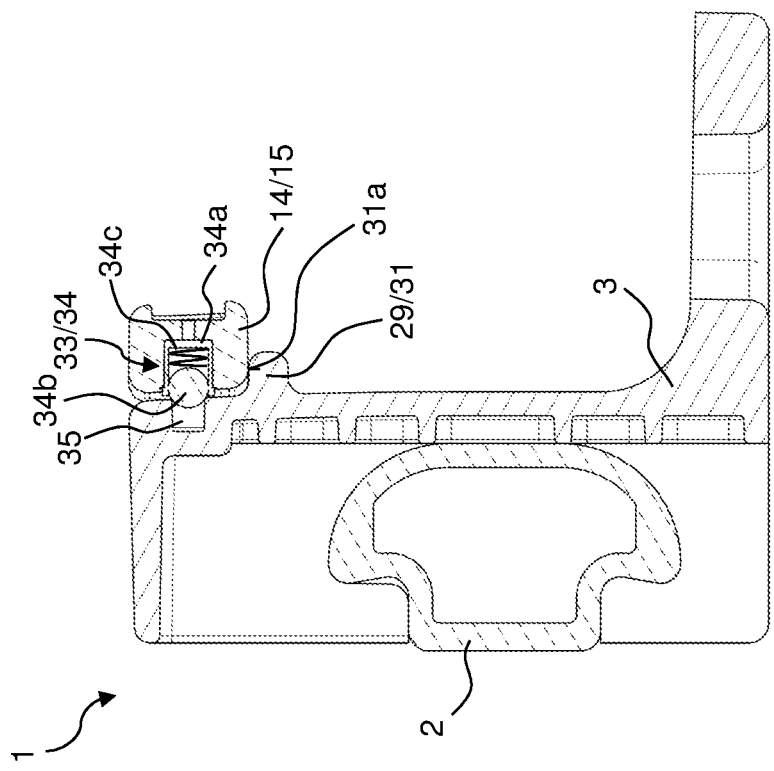
FIG. 7 shows a schematic cross section through the fastening system of FIG. 1 at the plane VII, through an elastic retaining element for holding the actuating element in the locked position.

FIG. 7 shows the fastening system 1 in a cross section (perpendicular to the extension direction) at the plane of a resilient retaining device 33 for the lever 14 or the actuating element 15; also refer in this regard to the marked plane VII in FIG. 1.

In the embodiment shown, the resilient retaining device 33 is formed with a spring plunger 34 which is integrated into the lever 14, in this case approximately in the middle of the lever 14. The pressure ball 34b, which is pressed by the compression spring 34c from the pressure piece sleeve 34a to the left in FIG. 7, engages in an opposite recess 35 in the load slide 3 when the actuating element 15 is in the locked position. As a result, the lever 14 is snapped onto the stop 29, in this case, with the lever 14 lying on the top side 31a of the extension 31. If the lever 14 is to be rotated upward (toward the unlocked position), the force of the compression spring 34c must be overcome, and the pressure ball 34b must be slightly pressed into the pressure piece sleeve 34a. This can easily be done manually by an operator but sufficiently secures the lever 14 against an unintentional loosening/abandonment of the locked position, for example in the event of driving-related vibrations while a vehicle is traveling.

Figure 8:
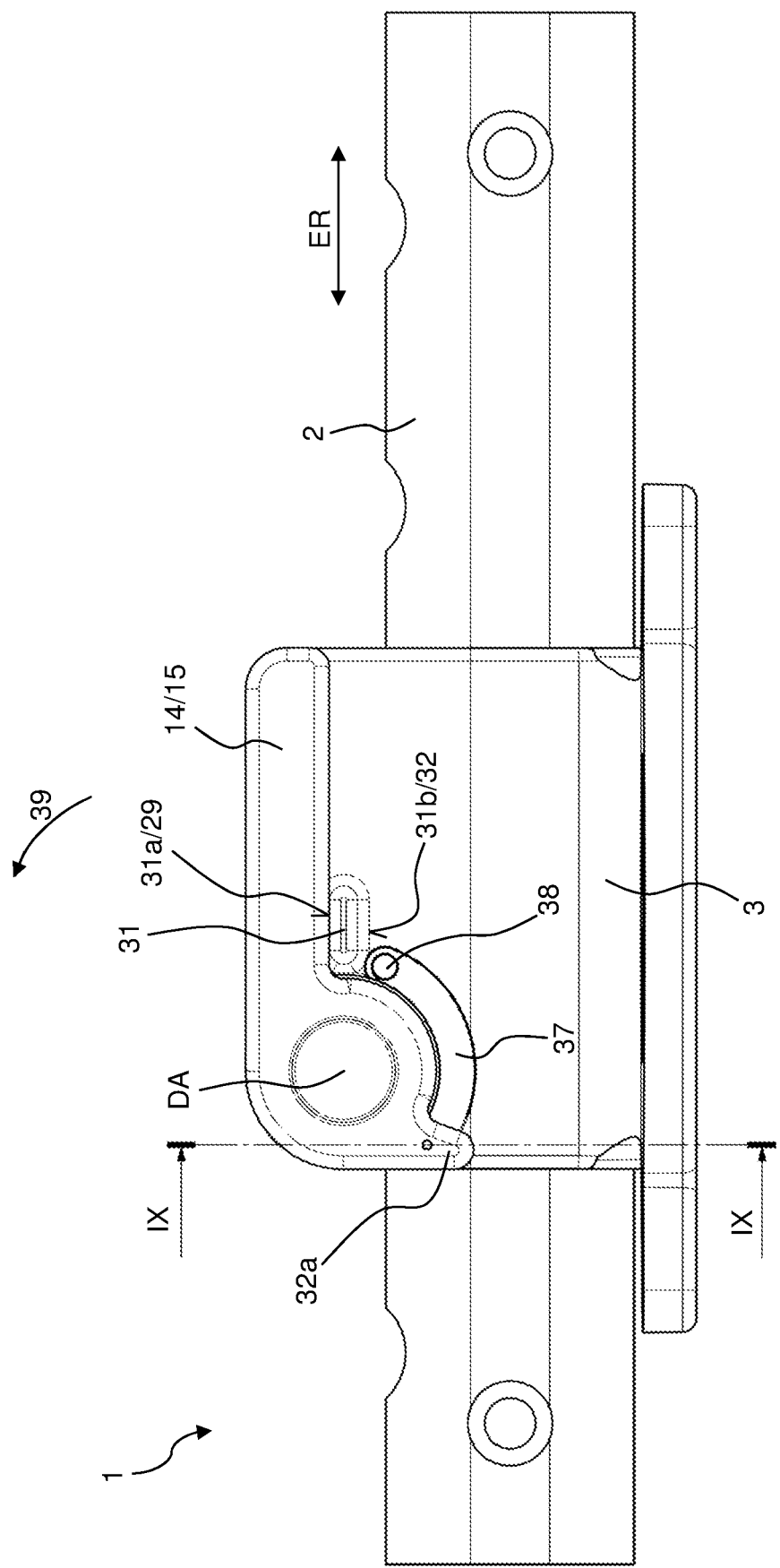
FIG. 8 shows a schematic front view of a second embodiment of a fastening system according to the invention, wherein the retaining device can hold in place both a locked position and an unlocked position of the actuating element.
Figure 9:
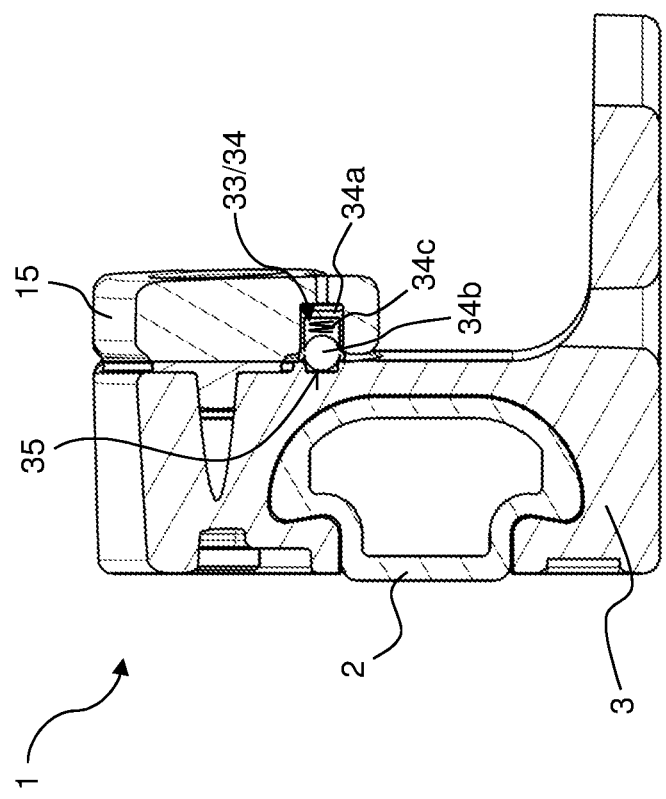
FIG. 9 shows a schematic cross section through the fastening system of FIG. 8 at the plane marked IX.

FIG. 8 in a schematic front view and FIG. 9 in a schematic cross section perpendicular to the extension direction ER on the plane marked IX in FIG. 8 show a second embodiment of a fastening system 1 according to the invention. This fastening system 1 largely corresponds to the embodiment of FIGS. 1-7 so that only the main differences are explained here.

In the embodiment shown, the resilient retaining device 33 is formed with a spring plunger 34 which is arranged in the nose 32a of the actuating element 15. The nose 32a is designed such that the nose 32a rotates on the load slide 3 in the area of a guide track 37 when the lever 14 is rotated in front of the front side of the load slide 3. Two recesses (depressions) 35, 38 are formed at the two ends of the guide track 37.

In the locked position of the actuating element 15, which is shown in FIGS. 8 and 9, the lever 14 bears against the upper side 31a of the extension 31 acting as stop 29, and the nose 32a is rotated away from the extension 31. The pressure ball 34b of the spring plunger 34 engages in the recess 35 located under the nose 32a (hidden in FIG. 8, refer to FIG. 9 in this regard) and thereby locks (holds in place) the locked position of the actuating element 15. The load slide 3 is secured on the load rail 2 by the engagement of the cam in a locking recess (hidden in FIGS. 8-9).

If the actuating element 15 is rotated into the unlocked position around the axis of rotation DA in the arrow direction 39, the pressure ball 34b must be slightly pressed against the force of the compression spring 34c into the pressure piece sleeve 34a, which is easily possible with manual effort, and can then travel on the guide track 37. As soon as the nose 32a has arrived above the further recess 38 (and the nose 32a bears against the underside 31b of the extension 31 as a further stop 32), the pressure ball 34b can snap into this further recess 38 and thereby also lock (hold in place) the unlocked position of the actuating element 15 (not shown in further detail). In the unlocked position, the load slide 3 can be moved on the load rail 2 along the extension direction ER.

In an analogous manner, the lever 14 can also be rotated back into the locked position with little manual effort.

Figure 10:
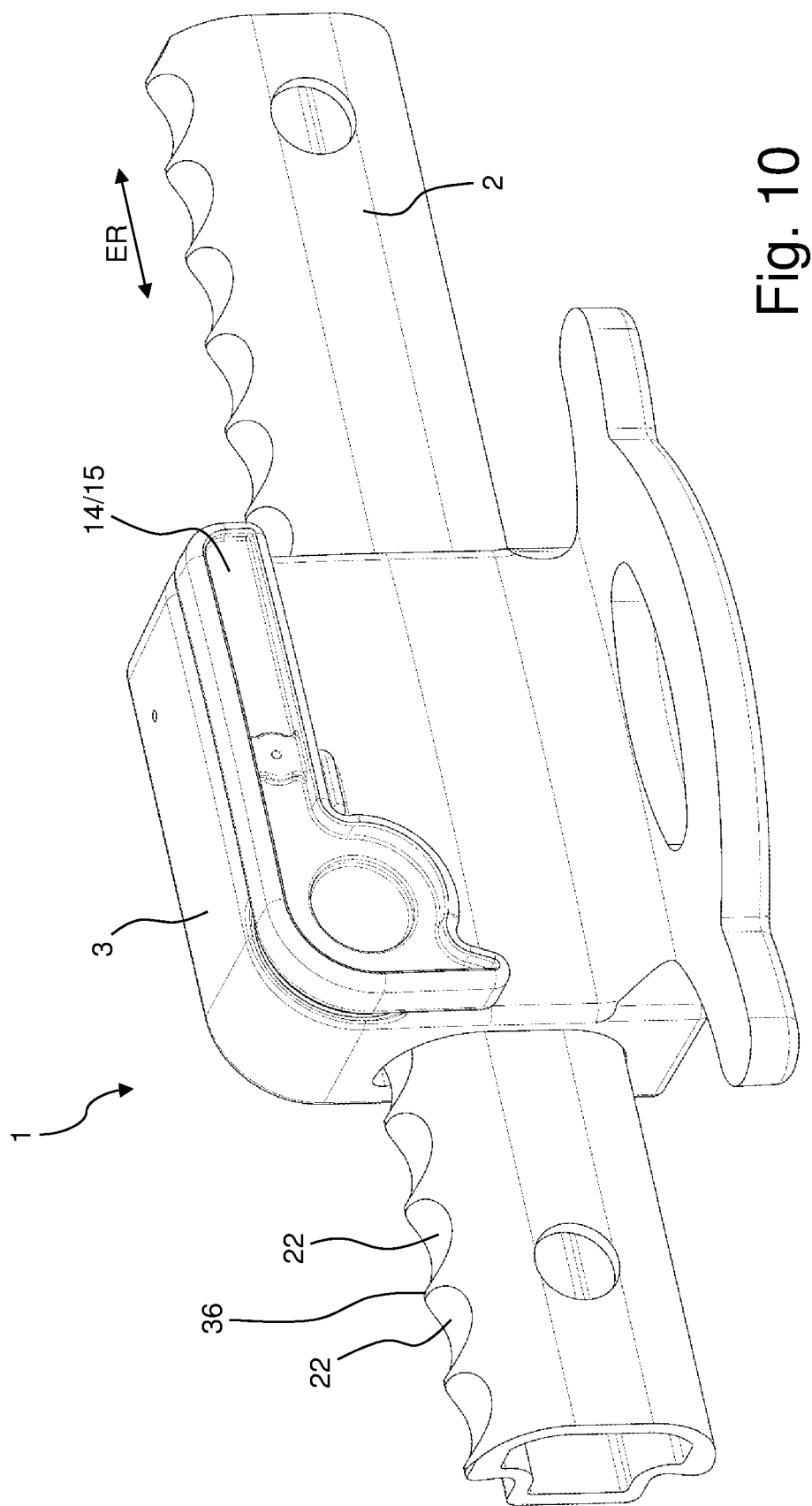
FIG. 10 shows a schematic view obliquely from the front of a third embodiment of a fastening system according to the invention, wherein the load rail has immediately consecutive locking recesses in its extension direction.

FIG. 10 shows a third embodiment of a fastening system 1 according to the invention, which largely corresponds to the embodiment of FIGS. 1-7 and in particular as shown in FIG. 1. Only the main differences are therefore explained.

In this fastening system 1, the load rail 2 has, in the extension direction ER of the load rail 2, immediately consecutive locking recesses 22 with only a minimal bar 36 remaining between adjacent round locking recesses 22; the bar 36 is preferably narrower than ½₀ the width of a locking recess 22 in the extension direction and is particularly preferably tapered. The bar 36 is so narrow that the cam (covered in FIG. 8, but refer to FIG. 4 above) of the load slide 3 generally slides into one of the locking recesses 22 (and takes the load slide 2 with it if necessary) without any problems (and regardless of the travel position the load slide 2 has initially reached) when the actuating element 15 is rotated into the locked position. In this case, an auxiliary locking device is unnecessary and is typically not used in the context of the invention.

Figure 11:
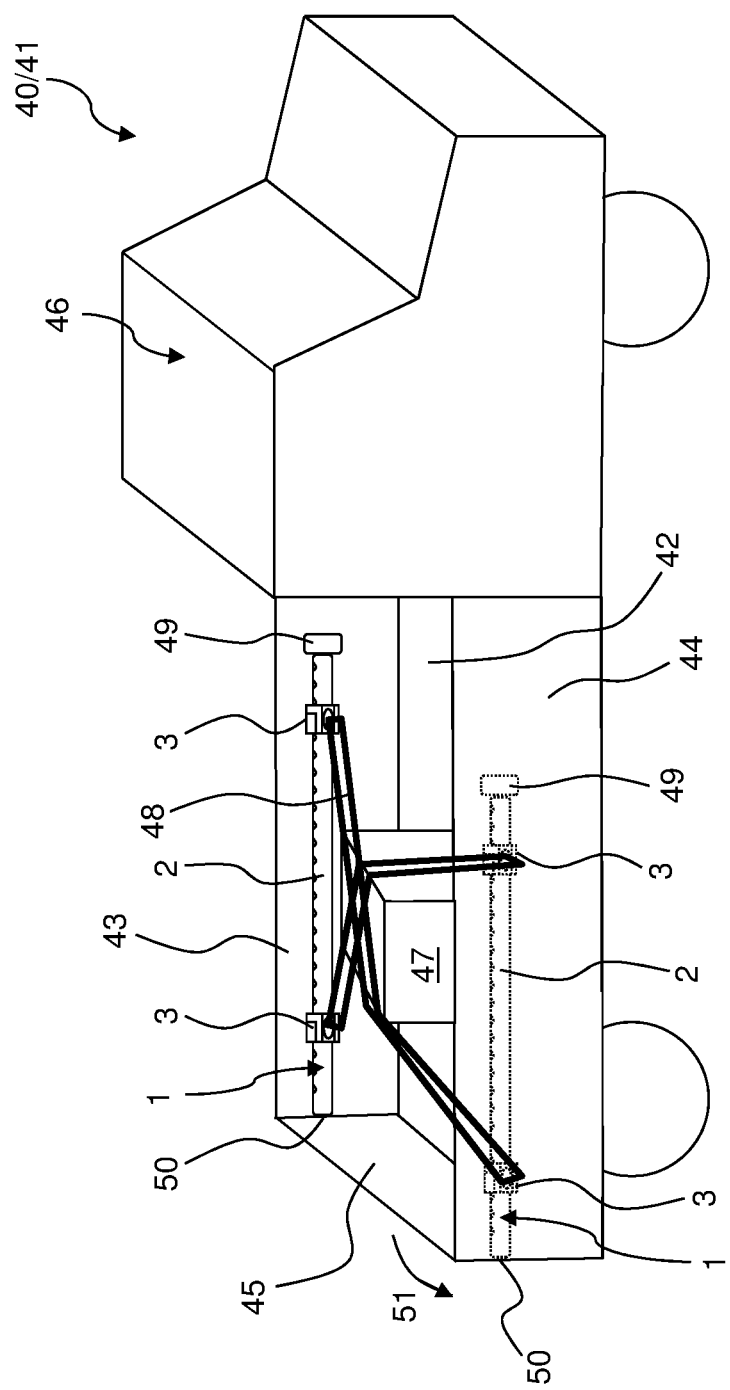
FIG. 11 shows a schematic view of a pick-up truck with a plurality of fastening systems according to the invention, wherein a load is tightened down on the load floor by means of the load slides and ropes.

FIG. 11 illustrates, by way of example, the use of fastening systems 1 according to the invention (as shown, for example, in FIGS. 1-10) on a vehicle 40. The vehicle 40 is designed here as a pick-up truck 41 and has a load floor 42 which is delimited by two side walls (loading space walls) 43, 44, a rear tailgate 45 and a passenger cabin 46 at the front.

A fastening system 1, according to the invention, is installed on the inner sides of the side walls 43, 44 (the fastening system 1 on the inner side of the side wall 44 is covered and therefore only indicated with dots). Each fastening system 1 has a load rail 2, which is screwed to the respective side wall, and in this case two load slides 3, which can be moved and locked on the respective load rail 2.

To fasten a load 47 to the load floor 42, securing elements 48, namely ropes, were passed through load-bearing eyes of the load slide 3 and tied down across the load 47. For this purpose, a suitable travel position of the load slide 3 on the load rails 2 was first moved to and locked.

In the design shown, the load rails 2 are provided with end stops 49, 50 at their two ends. The end stops 49 on the right side in FIG. 9 are configured by stop pieces that are permanently installed on the side walls 43, 44, and the left end stops 50 are configured by the tailgate 45, in front of which the load rails 2 end at a short distance. As long as the tailgate 45 is closed, the load slides 3 are held captively on the load rails 2. Accordingly, the load slides 3 can be secured against theft in a simple manner by closing the tailgate 45. On the other hand, the vehicle owner can easily add or remove load slides 3 when he opens the tailgate 45 (see opening movement 51), typically after unlocking it with a mechanical key or a remote control.

LIST OF REFERENCE SIGNS

1 Fastening system
2 Load rail
3 Load slide
4a (Front) hole
4b (Rear) hole
5 Front side
6 Rear side/side facing the contact surface
7 Contact surface
8 Base
9 Header
10a-b Collar element
11a-b Clamping elements
12a-b Section of the contact surface
13 Surface normal of the contact surface
14 Lever
15 Actuating element
16 Fastening device
17 Load-bearing eye
18a-b Tie-down hook
19 Screw
20 Auxiliary locking device
21 Cam
21a Cam core
21b Cam sleeve (cam bushing)
22 Locking recess
22' Locking recess (serving as auxiliary locking recess)
23 Round outer section
24 Flattened outer section 25 Resilient element
26 Spring plunger
26a Pressure piece sleeve
26b Pressure ball
26c Compression spring
27 Auxiliary locking recess
28 Intermediate section
29 Stop
30 Arrow direction (screwing in the cam)
31 Extension
31a Top side (extension)
31b Underside (extension)
32 Further stop
32a Nose (actuating element)
33 Resilient retaining device
34 Spring plunger
34a Pressure piece sleeve
34b Pressure ball
34c Compression spring
35 Recess
36 Bar
37 Guide track
38 Further recess
39 Arrow direction (direction of rotation of the actuating element)
40 Vehicle
41 Pick-up truck
42 Load floor
43 Side wall
44 Side wall
45 Tailgate
46 Passenger cabin
47 Load (cargo)
48 Securing element (rope here)
49 End stop (permanently installed)
50 End stop (tailgate)
51 Opening movement (tailgate)
α, α' Angle
DA Axis of rotation
ER Extension direction

What is claimed is:

1. A fastening system for fastening a load on a vehicle, the fastening system comprising:
a load rail; and
a load slide arranged on the load rail and movable on the load rail along an extension direction of the load rail;
wherein the load slide comprises at least one fastening device for fastening a securing element, and wherein the load slide is lockable at different travel positions on the load rail;
wherein the load slide encompasses the load rail from the outside, and on the outside of the load rail a plurality of locking recesses are formed, with the locking recesses following each other along the extension direction of the load rail;
wherein the load slide comprises a rotatably mounted cam, which is rigidly connected to an actuating element and which can be rotated with the actuating element between a locked position and an unlocked position; and
wherein, in the locked position, the cam can engage with one of the locking recesses and thus lock the travel position of the load slide, and, in the unlocked position, the cam is disengaged with respect to the locking recesses and the load slide can thus be moved on the load rail;
wherein the load rail comprises:
a base on which a contact surface is formed for bearing the load rail on the vehicle; and
a header which laterally protrudes on two opposite sides with collar elements from the base; and
wherein the load slide encompasses the header and thereby engages behind the collar elements of the header with clamping elements of the load slide; and
wherein the locking recesses are formed on one of the collar elements.

2. The fastening system according to claim 1, wherein the locking recesses are formed on the lateral outside of this collar element.

3. The fastening system according to claim 1, wherein the actuating element is fastened to the load slide with a screw, which is screwed into the load slide from a side of the load slide facing the contact surface.

4. The fastening system according to claim 1, wherein, in a cross section perpendicular to the extension direction of the load rail, a respective contact surface runs between the clamping elements and the collar elements at least in an engaging section at an angle α to the surface normal of the contact surface, with α>90°.

5. The fastening system according to claim 1, wherein the load slide comprises an auxiliary locking device with a resilient element, and the load rail comprises a plurality of auxiliary locking recesses, wherein when moving the load slide on the load rail, the resilient element can automatically snap into one of the auxiliary locking recesses at a plurality of travel positions, and wherein at the travel positions of the load slide snapped in place, the cam is arranged on one of the locking recesses so that the cam can engage in the locking recess when the locked position is set with the actuating element.

6. The fastening system according to claim 5, wherein the locking recesses for the cam are at the same time the auxiliary locking recesses for the resilient element.

7. The fastening system according to claim 5, wherein the resilient element is designed as a spring plunger.

8. The fastening system according to claim 1, wherein the locking recesses are arranged in direct succession in the extension direction of the load rail.

9. The fastening system according to claim 1, wherein the locking recesses are spaced apart in the extension direction of the load rail and periodically spaced apart.

10. The fastening system according to claim 1, wherein the actuating element is designed as a lever wherein, in the locked position, the lever is aligned parallel to the extension direction of the load rail and/or placed on the load slide, and, in the unlocked position, the lever is aligned transversely to the load rail and/or protrudes from the load slide.

11. The fastening system according to claim 1, wherein there is a stop for the actuating element in the locked position, wherein there is a further stop for the actuating element in the unlocked position.

12. The fastening system according to claim 1, wherein a retaining device is provided with which the actuating element can be retained in the locked position.

13. The fastening element according to claim 12, wherein the retaining device is also able to retain the actuating element in the unlocked position.

14. The fastening system according to claim 12, wherein the retaining device is designed as a resilient retaining device.

15. The fastening system according to claim 1, wherein the cam has a round outer section with a variable radius so that, when the actuating element is rotated from the unlocked position into the locked position, the engagement of the cam in the locking recess becomes deeper.

16. The fastening system according to claim 15, wherein the round outer section is designed as an eccentric.

17. The fastening system according to claim 1, wherein the cam has a flattened outer section so that, in the unlocked position, the flattened outer section is at least substantially parallel to the extension direction of the load rail.

18. The fastening system according to claim 1, wherein the cam is formed with a cam core made of metal and a cam sleeve made of plastic, which surrounds the cam core.

19. The fastening system according to claim 1, wherein the at least one fastening device comprises a load-bearing eye and/or two tie-down hooks that are opposite one another.

20. The fastening system according to claim 1, wherein the cam is rotatable about an axis of rotation, wherein the axis of rotation is perpendicular to the extension direction of the load rail.

21. The vehicle with the fastening system according to claim 1, wherein the load rail with a load slide arranged thereon is fastened to the vehicle in the region of a loading space or a load floor.

22. The vehicle according to claim 21, wherein the load rail has at each of its two ends an end stop for the load slide, which is either fixedly formed on the vehicle or which can only be released by opening a lockable tailgate or door.

23. Use of the fastening system according to claim 1 for fastening the load on the vehicle, wherein the load rail with a load slide arranged thereon is fastened to the vehicle in the region of a loading space or a load floor, wherein the load slide is moved on the load rail into a desired travel position and is locked in this travel position on the load rail, and wherein a securing element for the load, being a strap or a rope, is fastened and tightened to the at least one fastening device of the load slide.

* * * * *

UNITED STATES PATENT AND TRADEMARK OFFICE
CERTIFICATE OF CORRECTION

| | |
|---|---|
| PATENT NO. | : 11,433,951 B2 |
| APPLICATION NO. | : 16/830777 |
| DATED | : September 6, 2022 |
| INVENTOR(S) | : Sascha Fischer, Waldemar Ekkert and Waldemar Kalatschew |

It is certified that error appears in the above-identified patent and that said Letters Patent is hereby corrected as shown below:

In the Claims

Column 14, Claim 13, Line 59, "fastening element" should read --fastening system--.

Signed and Sealed this
Twenty-fifth Day of October, 2022

Katherine Kelly Vidal
*Director of the United States Patent and Trademark Office*